(12) United States Patent
Charles et al.

(10) Patent No.: US 11,102,300 B2
(45) Date of Patent: Aug. 24, 2021

(54) SAN ADVISORY BASED ON LATENCY (71) Applicant: EMC IP Holding Company LLC, Hopkinton, MA (US)

(72) Inventors: Peniel Charles, Bangalore (IN); Manikandan Sethuraman, Bangalore (IN); Karthik Mani, Bangalore (IN); Shashidhar R. Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 16/666,558

(22) Filed: Oct. 29, 2019

(65) Prior Publication Data
US 2021/0126969 A1  Apr. 29, 2021

(51) Int. Cl.
G06F 15/16 (2006.01)
H04L 29/08 (2006.01)
G06F 3/06 (2006.01)

(52) U.S. Cl.
CPC ........ H04L 67/1097 (2013.01); G06F 3/0604 (2013.01); G06F 3/067 (2013.01); G06F 3/0611 (2013.01); G06F 3/0635 (2013.01)

(58) Field of Classification Search
CPC .................................................. H04L 67/1097
See application file for complete search history.

(56) References Cited

U.S. PATENT DOCUMENTS

| 2014/0052845 A1* | 2/2014 | Nayak | G06F 3/0665 709/224 |
| 2015/0319245 A1* | 11/2015 | Nishihara | G06F 3/0647 709/213 |
| 2016/0292056 A1* | 10/2016 | Kulli | G06F 11/0751 |

* cited by examiner

Primary Examiner — Kevin T Bates
Assistant Examiner — Clarence D McCray
(74) Attorney, Agent, or Firm — Muirhead and Saturnelli, LLC (57) ABSTRACT Determining an optimal path through a storage area network from a specific initiator to a specific target includes determining a plurality of possible paths through the storage area network between the specific initiator and the specific target, examining a plurality of previously-determined latency values for each of the paths, the previously-determined latency values being set according to empirical observation of propagation through each of the paths, and choosing a specific one of the paths having a lowest latency value. The previously-determined latency values may be determined by sending a command from the specific initiator to the specific target. The command may avoid queuing any I/O operations at the specific target. The command may be a status request command or a vendor specific command. The source may be a host system and the target may be a storage system. The previously-determined latency may be measured using a PowerPath Management Appliance.

9 Claims, 5 Drawing Sheets

SAN ADVISORY BASED ON LATENCY

TECHNICAL FIELD

This application relates to the field of computer systems and storage systems therefor and, more particularly, to the field of choosing an optimal path through a storage area network for a host system that accesses a storage system through the storage area network.

BACKGROUND OF THE INVENTION

Host processor systems may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system unit allows the host systems to share data stored therein.

In many instances, host systems are coupled to storage systems through a storage area network (SAN). A SAN allows reconfiguring connections without having to physically disconnect and reconnect cables from and to ports of the devices and may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

A drawback to using a SAN is that a SAN may introduce latency into the system that leads to I/O performance degradation but may be difficult to detect nonetheless. A host accessing a storage system may experience a delay but, without a relatively sophisticated mechanism for determining the source of the delay, the host system may (incorrectly) attribute the delay to issues with the storage system rather than the SAN. Moreover, even in instances where it is possible to ascertain that the delay is caused by the SAN, it may be difficult to determine alternative paths through the SAN (i.e., paths using different combinations of switches) that could decrease latency introduced by the SAN, especially in instances where different ones of the switches are provided by different vendors since vendor tools tend to work only with devices provided by the same vendor. In many instances, it may be necessary to configure the system to try different paths and then determine whether a new path has improved SAN performance or not. This can be inefficient and, in addition, may not necessarily lead to selection of an optimal path.

Accordingly, it is desirable to provide a mechanism that facilitates selection of an optimal path between an initiator and a target through a SAN.

SUMMARY OF THE INVENTION

According to the system described herein, determining an optimal path through a storage area network from a specific initiator to a specific target includes determining a plurality of possible paths through the storage area network between the specific initiator and the specific target, examining a plurality of previously-determined latency values for each of the paths, the previously-determined latency values being set according to empirical observation of propagation through each of the paths, and choosing a specific one of the paths having a lowest latency value. The previously-determined latency values may be determined by sending a command from the specific initiator to the specific target. The specific command may avoid queuing any I/O operations at the specific target. The specific command may be a status request command or a vendor specific command. The specific source may be a host system and the specific target may be a storage system. The command may be a PowerPath powermnt display dev=LUN command where LUN represents a logical volume on the storage system. The previously-determined latency may be measured using a PowerPath Management Appliance.

According further to the system described herein, a non-transitory computer readable medium contains software that determines an optimal path through a storage area network from a specific initiator to a specific target. The software includes executable code that determines a plurality of possible paths through the storage area network between the specific initiator and the specific target, executable code that examines a plurality of previously-determined latency values for each of the paths, the previously-determined latency values being set according to empirical observation of propagation through each of the paths, and executable code that chooses a specific one of the paths having a lowest latency value. The previously-determined latency values may be determined by sending a command from the specific initiator to the specific target. The specific command may avoid queuing any I/O operations at the specific target. The specific command may be a status request command or a vendor specific command. The specific source may be a host system and the specific target may be a storage system. The command may be a PowerPath powermnt display dev=LUN command where LUN represents a logical volume on the storage system. The previously-determined latency may be measured using a PowerPath Management Appliance.

According further to the system described herein, a storage area network includes a plurality of interconnected switches, at least one initiator port coupled to the switches, and at least one target port coupled to the switches, the at least one initiator port coupled to the at least one target port by determining a plurality of possible paths through the storage area network between the at least one initiator port and the at least one target port, examining a plurality of previously-determined latency values for each of the paths, the previously-determined latency values being set according to empirical observation of propagation through each of the paths, and by choosing a specific one of the paths having a lowest latency value. The previously-determined latency values may be determined by sending a command from the at least one initiator to the at least one target. The specific command may avoid queuing any I/O operations at a target coupled to the at least one target port. The specific command may be a status request command or a vendor specific command. The command may be a PowerPath powermnt display dev=LUN command where LUN represents a logical volume on a storage system coupled to the at least one target port. The previously-determined latency may be measured using a PowerPath Management Appliance.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein facilitates selecting different routing options (paths) through a Storage Area Network (SAN) even in instances where different switches of the SAN are provided by different vendors.

Figure 1:
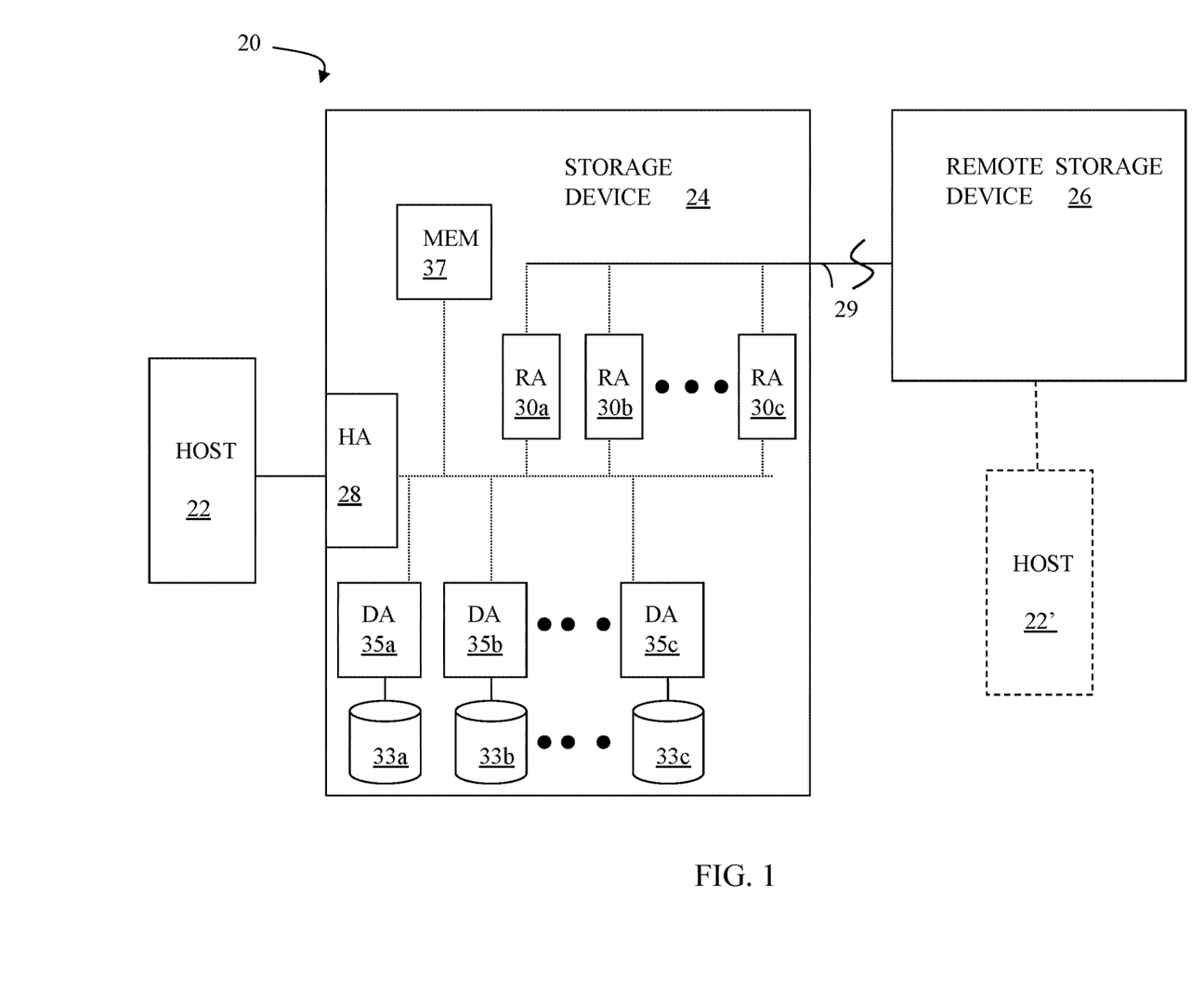
FIG. 1 is a schematic illustration of a storage system showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage systems, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
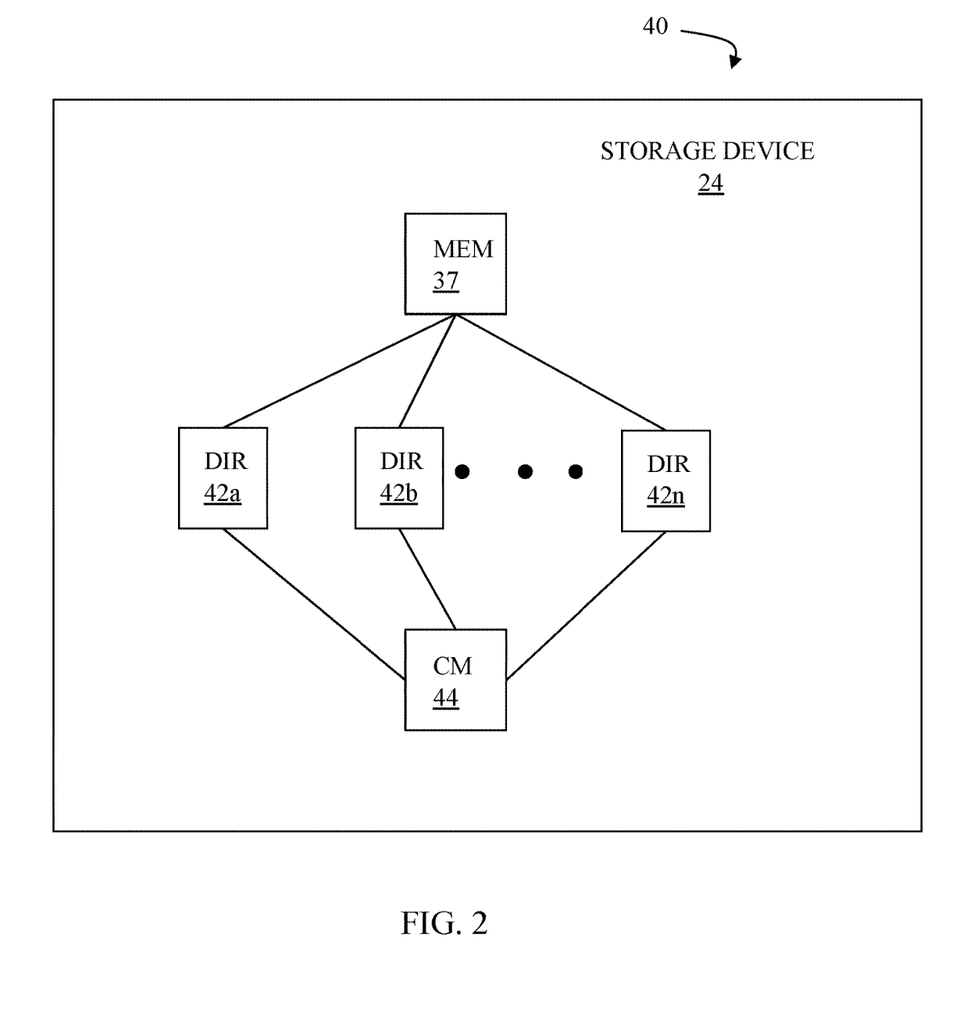
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
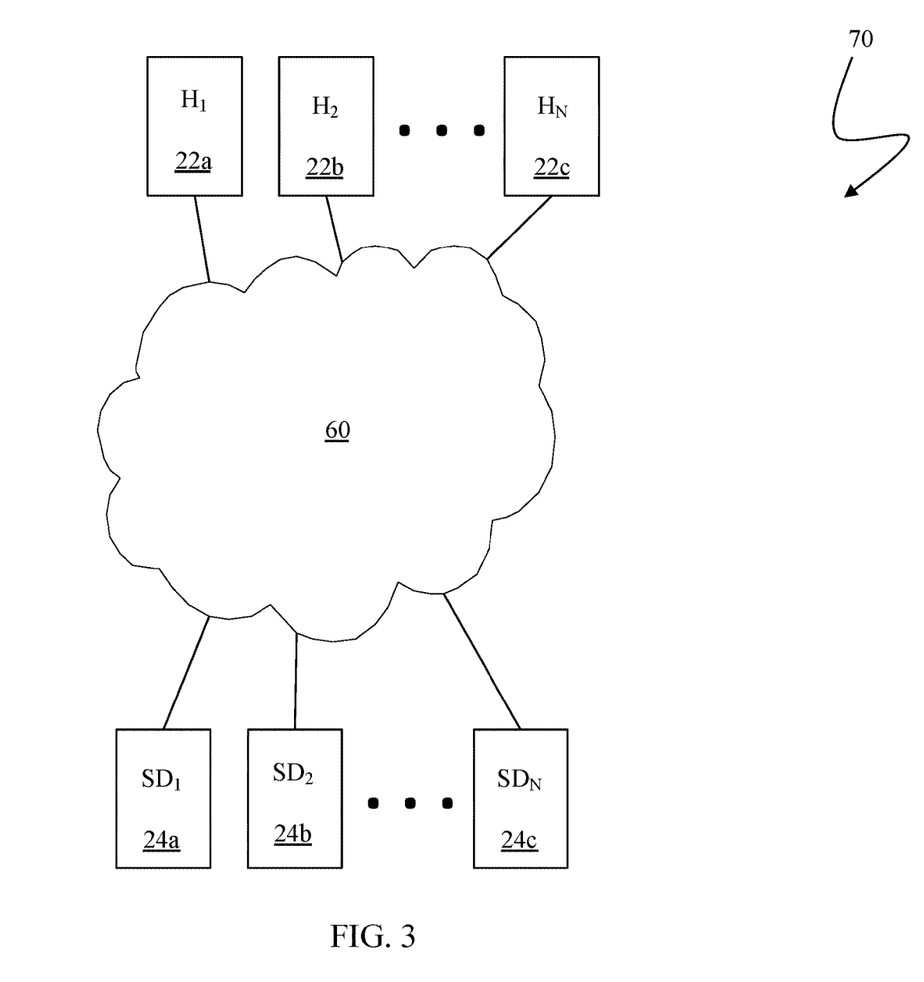
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
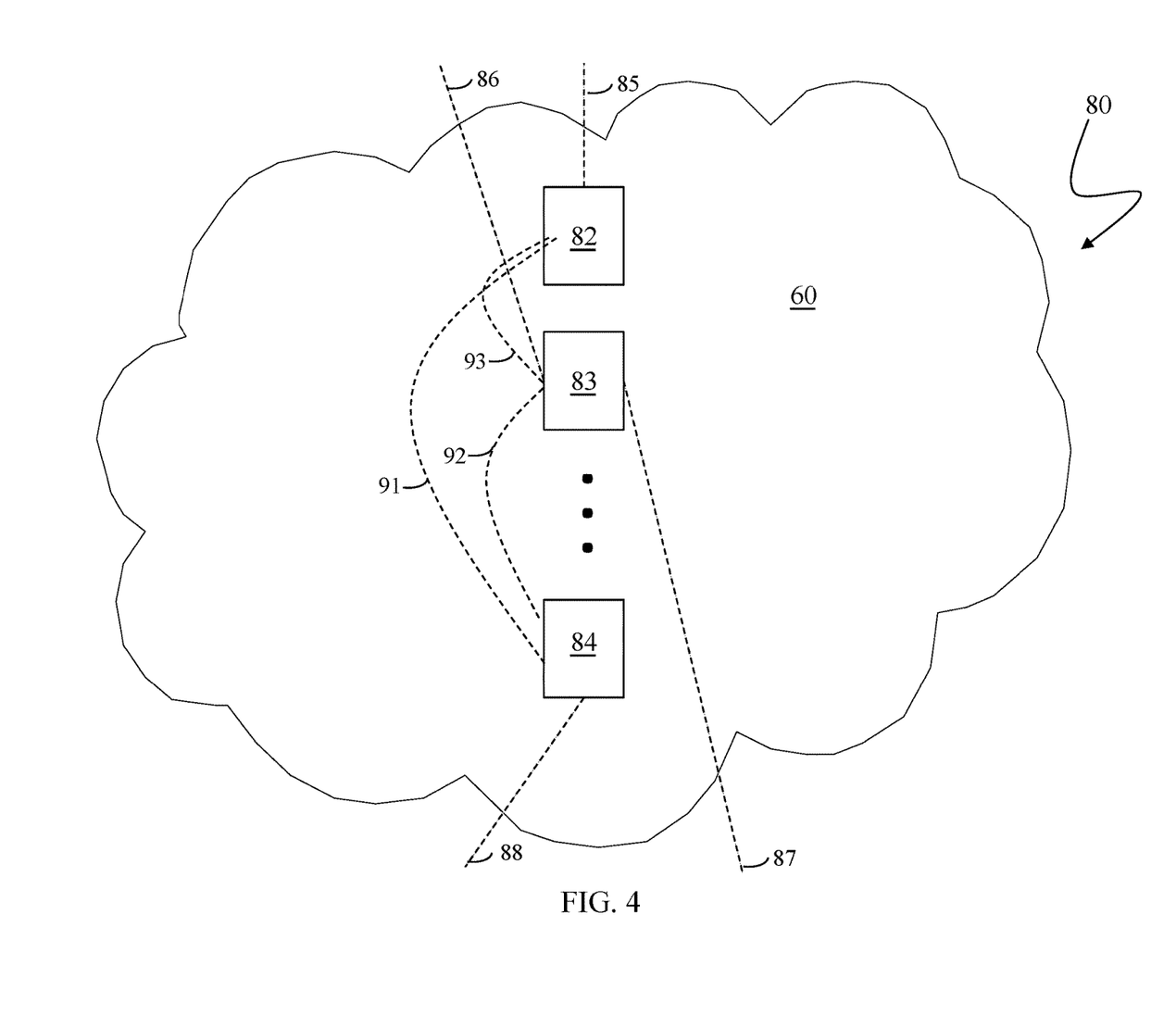
FIG. 4 is a schematic illustration showing in more detail a SAN that may be used in connection with an embodiment of the system described herein.

Referring to FIG. 4, a schematic illustration 80 shows the SAN 60 in more detail as including a plurality of switches 82-84. The SAN 60 may also have a plurality of external connections 85-88 that are provided by the switches 82-84 where some of the external connections 85, 86 may each be coupled to a host system (not shown in FIG. 4) and other external connections 87, 88 may each be coupled to a storage system (not shown in FIG. 4). The SAN 60 also include internal connections 91-93 between the switches. Note that, although three switches 82-84 are shown in the schematic illustration 80, the SAN may have any number of switches, some of which may not be directly coupled to all of the other switches. Generally, a data path through the switches 82-84 exists between a host system (initiator) and a storage system (target) that is accessed by the host system. The system described herein determines an optimal path through the switches 82-84 that minimizes latency of the SAN 60. The optimal path may be determined in connection with reconfiguring the system (e.g., adding or removing one or more switches, host systems, and/or storage systems) or in connection with system rebalancing, possibly in light of a suspected change in access patterns by one or more of the host systems.

Figure 5:
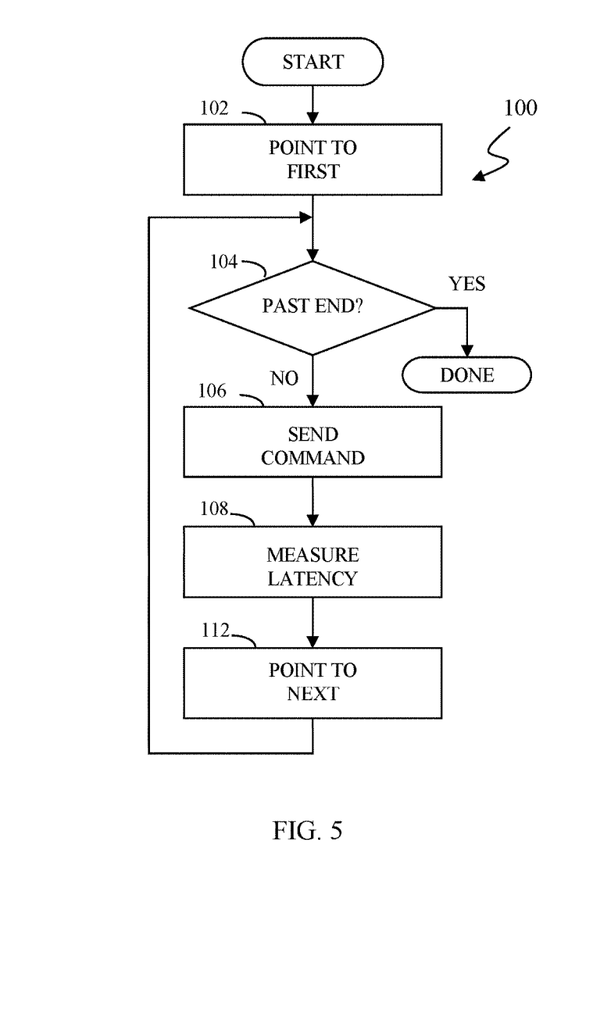
FIG. 5 is a flow diagram illustrating processing performed in connection with determining latency of different paths through a SAN according to an embodiment of the system described herein.

Referring to FIG. 5, a flow diagram 100 illustrates processing performed in connection with determining latency of different paths in the SAN 60. In an embodiment herein, latency is measured for each existing path between each of the host systems and the storages systems accessed by the host systems. As described in more detail elsewhere herein, the latency information may be used to determine one or more optimal paths through the SAN 60.

Processing begins at a first step 102 to initialize an iteration pointer that iterates through a list of all of the initiator/target pairs in the SAN 60 (i.e., all of the combinations of host systems and storages systems accessed by the host systems). Following the step 102 is a test step 104 where it is determined if the iteration pointer points past the end of the list. If so, then processing is complete. Otherwise, control passes from the test step 104 to a step 106 where a command is sent from the initiator to the target to measure latency of the SAN 60 via an existing path (indicated by the iteration pointer) through the switches 82-84 between the initiator and the target. Note that the existing path is previously configured using any appropriate mechanism, including being manually configured by a system administrator or using the system described herein. The command that is sent at the step 106 is chosen so as to not perform any actual I/O operations because it is useful to prevent any I/O or command queuing at the storage system that would skew measurement of latency of the SAN 60. In an embodiment herein, a PowerPath powermnt display dev=LUN command is used where LUN represents a logical volume on the target storage system and where the command displays information about the specific LUN. Note that other PowerPath commands may be used and that, for systems that use different multipathing software, other, similar, commands for the different multipathing software may be used. Generally, a status request command may be used because it is expected that a status request command will not result in queuing any I/O operations (or anything else) at the target. In instances where the target is a VMAX storage system, the command may be a VMAX vendor specific command of 0xC3, which causes the receiving VMAX storage system to immediately respond with a success indicator.

Following the step 106 is a step 108 where the latency is measured by empirically observing the actual delay that occurs. In an embodiment herein, the latency is the time between sending the command and receiving a response. The latency value, along with the switches that correspond to the path being measured, are stored for future reference, described in more detail elsewhere herein. Following the step 108, control transfers to a step 112 where the pointer that iterates through a list of all of the initiator/target pairs in the SAN 60 is incremented (i.e., made to point to the next path). Following the step 112, control transfers back to the step 104, discussed above, for another iteration. In an embodiment herein, the processing illustrated by the flow diagram 100 may be performed every thirty minutes, although any appropriate time interval may be used. Also, the processing may be performed by a PowerPath Management Appliance provided by Dell/EMC of Hopkinton, Mass., although it is possible to use other devices/systems, including a different standalone device, one of the host systems or one of the storage systems. The system may use Storage Resource Manager (SRM) software provided by Dell/EMC to determine the topology of the SAN 60, although any appropriate software/mechanism may be used to ascertain the topology.

Figure 6:
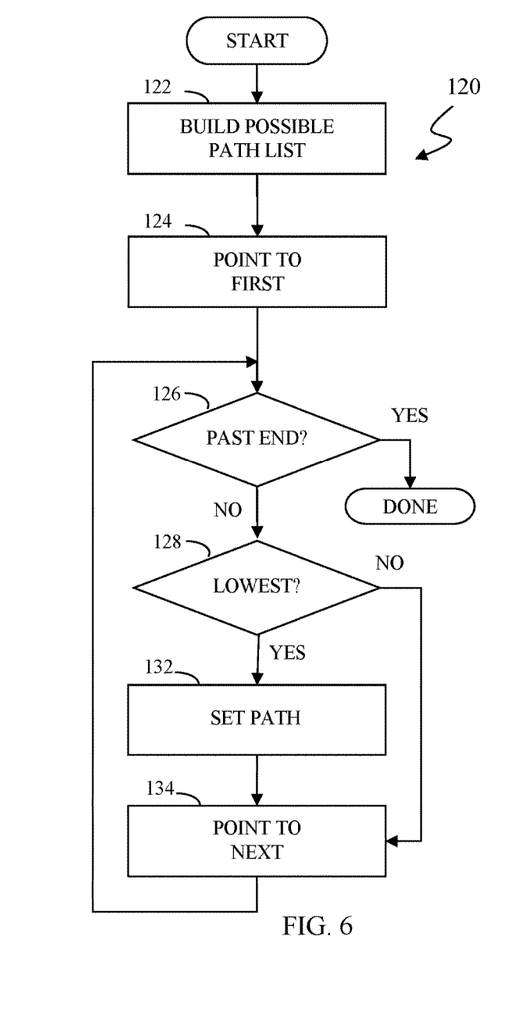
FIG. 6 is a flow diagram illustrating processing performed in connection with selecting a path through a SAN according to an embodiment of the system described herein.

Referring to FIG. 6, a flow diagram 120 illustrates processing performed in connection with determining an optimal path through the switches 82-84 of the SAN 60. As discussed elsewhere herein, an optimal path may be determined in connection with reconfiguring the system or in connection with system rebalancing. Also, just as with the flow diagram 100, discussed above, the processing illustrated by the flow diagram 120 may be performed by a PowerPath Management Appliance provided by Dell/EMC of Hopkinton, Mass., a different standalone device, one of the host systems or one of the storage systems. As described in more detail elsewhere herein, the system selects a combination of switches that is expected to have a lowest latency for a particular target and initiator.

Processing begins at a first step 122 where the system builds a list of possible paths through the switches 82-84 of the SAN 60. Generally, there may exist a number of switch combinations that can be used to connect initiator and target systems/devices. Note also that, in instances where a new storage system or a new host system is being added, one or both of the terminal switches may be selected from a plurality of the switches 82-84. In other cases, where the terminal switches are already set (e.g., a rebalancing), the terminal switches may be fixed. Determining a list of possible paths at the step 122 may be performed using any of a number of possible mechanisms, including conventional routing algorithms provided, for example, by the VMWare SRM software mentioned above. Following the step 122, processing proceeds to a step 124 to initialize an iteration pointer that iterates through a list of all of paths determined at the step 122. Following the step 124 is a test step 126 where it is determined if the iteration pointer points past the end of the list. If so, then processing is complete. Otherwise, control passes from the test step 126 to a test step 128 where it is determined if the path indicated by the iteration pointer represents a path having the lowest latency. As discussed in connection with the flow diagram 100 of FIG. 5, latency for each of the possible paths through the system is determined periodically. If it is determined at the test step 128 that the path corresponding to the iteration pointer has a lowest latency, then control transfers from the test step 128 to a step 132 where the current path is set to be the selected path. Note that, for a future iteration, if a subsequent path is determined to have an even lower latency, then the subsequent path will be set to the selected path. Following the step 132 is a step 134 where the iteration pointer is incremented. Note that the step 134 is reached directly from the step 128 if it is determined at the test step 128 that the path corresponding to the iteration pointer does not have a lower latency that a path that was previously set. Following the step 134, control transfers back to the step 126, discussed above, for another iteration.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of determining an optimal path through a storage area network from a specific initiator to a specific target, comprising:
    determining a plurality of possible paths through the storage area network between the specific initiator and the specific target;
    determining a plurality of latency values by sending, on each of the paths from the specific initiator to the specific target, a status request command to avoid queuing any I/O operations and by measuring a propagation time through each of the paths;
    examining the plurality of latency values for each of the paths that are set according to empirical observation of the propagation time through each of the paths; and
    choosing a specific one of the paths having a lowest latency value.

2. A method, according to claim 1, wherein the specific initiator is a host system and the specific target is a storage system.

3. A method, according to claim 1, wherein the previously-determined latency is measured using a PowerPath Management Appliance.

4. A non-transitory computer readable medium containing software that determines an optimal path through a storage area network from a specific initiator to a specific target, the software comprising:
   executable code that determines a plurality of possible paths through the storage area network between the specific initiator and the specific target;
   executable code that determines a plurality of latency values by sending, on each of the paths from the specific initiator to the specific target, a status request command to avoid queuing any I/O operations and by measuring a propagation time through each of the paths;
   executable code that examines the plurality of latency values for each of the paths that are set according to empirical observation of the propagation time through each of the paths; and
   executable code that chooses a specific one of the paths having a lowest latency value.

5. A non-transitory computer readable medium, according to claim 4, wherein the specific initiator is a host system and the specific target is a storage system.

6. A non-transitory computer readable medium, according to claim 4, wherein the previously-determined latency is measured using a PowerPath Management Appliance.

7. A storage area network, comprising:
   a plurality of interconnected switches;
   at least one initiator port coupled to the switches; and
   at least one target port coupled to the switches, the at least one initiator port coupled to the at least one target port by determining a plurality of possible paths through the storage area network between the at least one initiator port and the at least one target port, determining a plurality of latency values by sending, on each of the paths from the specific initiator port to the specific target port, a status request command to avoid queuing any I/O operations and by measuring a propagation time through each of the paths, examining the plurality of latency values for each of the paths that are set according to empirical observation of the propagation time through each of the paths, and by choosing a specific one of the paths having a lowest latency value.

8. A storage area network, according to claim 7, wherein the previously-determined latency is measured using a PowerPath Management Appliance.

9. A storage area network, according to claim 7, wherein the specific initiator is a host system and the specific target is a storage system.

* * * * *